(12) United States Patent
Sun et al.

(10) Patent No.: US 7,384,882 B2
(45) Date of Patent: Jun. 10, 2008

(54) PROCESS FOR REGENERATING TITANIUM-CONTAINING CATALYSTS

(75) Inventors: Bin Sun, Beijing (CN); Wei Wu, Beijing (CN); Enquan Wang, Beijing (CN); Yongxiang Li, Beijing (CN); Shuzhong Zhang, Beijing (CN); Lingmin Hu, Beijing (CN)

(73) Assignees: China Petroleum & Chemical Corporation, Beijing (CN); Research Institute of Petroleum Processing, SINOPEC, Beijing (CN)

( * ) Notice: Subject to any disclaimer, the term of this patent is extended or adjusted under 35 U.S.C. 154(b) by 149 days.

(21) Appl. No.: 10/448,372

(22) Filed: May 30, 2003

(65) Prior Publication Data

US 2003/0228970 A1    Dec. 11, 2003

(30) Foreign Application Priority Data

May 31, 2002    (CN) .............................. 02 1 20784

(51) Int. Cl.
*B01J 20/34* (2006.01)
(52) U.S. Cl. ........................... 502/27; 502/20; 502/22; 502/25; 502/514
(58) Field of Classification Search ................ 502/20, 502/22, 25, 27, 514
See application file for complete search history.

(56) References Cited

U.S. PATENT DOCUMENTS

| | | | | |
|---|---|---|---|---|
| 2,869,986 | A | * | 1/1959 | Foster et al. ................ 549/531 |
| 3,943,051 | A | * | 3/1976 | Ward .................... 208/111.15 |
| 4,072,628 | A | * | 2/1978 | Kruse et al. .................. 502/27 |
| 4,268,415 | A | * | 5/1981 | Mohan et al. ................. 502/25 |
| 4,290,920 | A | * | 9/1981 | Suresh et al. ................ 502/27 |
| 4,330,429 | A | * | 5/1982 | Sasaki et al. ................ 502/26 |
| 4,396,783 | A | * | 8/1983 | Esposito et al. ............ 568/706 |
| 4,410,501 | A | | 10/1983 | Taramasso et al. |
| 4,480,135 | A | | 10/1984 | Esposito et al. |
| 4,794,198 | A | | 12/1988 | Roffia et al. |
| 4,918,194 | A | | 4/1990 | Roffia et al. |
| 4,952,548 | A | * | 8/1990 | Kato et al. ................... 502/217 |
| 5,320,819 | A | | 6/1994 | Mantegazza et al. |
| 5,820,693 | A | * | 10/1998 | Patchett et al. .......... 134/22.12 |
| 5,863,855 | A | * | 1/1999 | Nojima et al. ............... 502/309 |
| 6,025,292 | A | | 2/2000 | Obayashi et al. |
| 6,395,665 | B2 | * | 5/2002 | Nojima et al. ................ 502/25 |
| 6,764,662 | B2 | * | 7/2004 | Chen et al. ................... 423/22 |
| 6,861,383 | B2 | * | 3/2005 | Crocker et al. ............... 502/26 |

FOREIGN PATENT DOCUMENTS

| | | |
|---|---|---|
| CN | 1130882 | 9/1996 |
| CN | 1290194 | 4/2001 |
| CN | 1302693 | 11/2001 |
| EP | 208311 | 1/1987 |
| EP | 230949 | 8/1987 |
| EP | 267362 | 5/1988 |
| EP | 347926 | 12/1989 |
| EP | 496385 | 7/1992 |
| EP | 564040 | 10/1993 |
| WO | WO 01/52982 A1 * | 7/2001 |

OTHER PUBLICATIONS

English Language Abstract of CN 13-02693.
English Language Abstract of CN 12-90194.
English Language Abstract of CN 11-30882.
J. Le Bars et al., Applied Catalysis A: vol. 136 (1996), pp. 69-80.
Peng We et al., Journal of Catalysis, vol. 168, pp. 400-411.
P. Roffia et al., New Developments in Selective Oxidation: 1990, pp. 43-50.
Selective Oxidation by Heterogeneous Catalysis, 2001, pp. 108-113.

* cited by examiner

*Primary Examiner*—Stanley S. Silverman
*Assistant Examiner*—Paul Wartalowicz
(74) *Attorney, Agent, or Firm*—Scully, Scott, Murphy & Presser, P.C.

(57) ABSTRACT

The present invention discloses a process for regenerating titanium-containing catalysts, characterized in that a deactivated catalyst is treated in an acidic solution having a pH value of $\leq 3$, and then dried and calcined. The process is simple in procedure and can make the catalytic activity, selectivity and stability of the regenerated catalyst be recovered to the level of its fresh catalyst.

12 Claims, No Drawings

US 7,384,882 B2

PROCESS FOR REGENERATING TITANIUM-CONTAINING CATALYSTS

TECHNICAL FIELD

The present invention relates to a process for regenerating catalysts, more particularly, to a process for regenerating a titanium-containing catalyst used in the ammoximation of carbonyl compounds or in the oxidation of nitrogenated basic compounds.

BACKGROUND ART

The reaction of a carbonyl compound with hydroxylamine is a major process for the synthesis of the corresponding oxime compound. For example, cyclohexanone oxime is a key intermediate for producing ε-caprolactam; while ε-caprolactam is an important raw material for organic chemical industries, mainly used as a monomer for synthetic fibers and engineering plastics (e.g., nylon-6). About 91% of caprolactam are produced industrially through a technique route with cyclohexanone oxime as intermediate product, in which cyclohexanone oxime is produced by the reaction of cyclohexanone with hydroxylamine (used in its sulfate or phosphate form). This process for the production of cyclohexanone oxime has a complex technology with multiple process steps and high investment in equipment, and it also has a problem in corrosion and pollution due to use or production of NOx, SOx and the like.

In the early 1980's, in U.S. Pat. No. 4,410,501, Taramasso (Italy) disclosed a novel type of catalytic material—titanium silicalite having an excellent function for selective oxidation of hydrocarbons, alcohols, phenols and the like (EP 0230949, U.S. Pat. No. 4,480,135, U.S. Pat. No. 4,396,783). It has been commercialized to use it for the preparation of catechol and hydroquinone by the selective oxidation of phenol with hydrogen peroxide.

EP 0208311, EP 0267362, EP 0496385, EP 0564040 and so on sequentially disclose a process for preparing cyclohexanone oxime in one step by ammoximation of cyclohexanone with ammonia and hydrogen peroxide catelyzed by titanium silicalite. This novel process features in mild reaction conditions, high yields of desired products, more efficient process, lower investment in equipment, reduced amount of wastes and environmental friend.

Furthermore, applications of other titanium-containing catalytic materials in ammoximation have also been reported. For example, EP 0347926 discloses that the ammoximation of cyclohexanone is carried out by using a catalyst in which titanium dioxide is dispersed on silica, both J. Le. Bars et al., Appl. Catal. A 136(1996) p.69 and P. Wu et al., J. Catal. 168 (1997) p. 400 report other types of Ti-containing crystalline silicate (e.g. Ti-ZSM-48, Ti-β, Ti-MOR and the like) which are used in ammoximation of a variety of aldehyde or ketone compounds.

The reaction of a nitrogenated basic compound with hydrogen peroxide is a major process for the synthesis of the corresponding hydroxylamine. In U.S. Pat. No. 4,918,194 and U.S. Pat. No. 5,320,819, it is reported that oxidation of a nitrogenated basic compound (e.g. secondary amines, ammonia and the like) is carried out by using a titanium silicalite or an amorphous titanium-containing catalyst.

With catalytic reactions being studied increasingly and intensively, more attention has been increasingly paid to the problem on stability of titanium-containing catalysts, especially titanium silicalites, in the ammoximation reaction of cyclohexanone for the preparation of cyclohexanone oxime.

EP 0496385 reports that it is necessary to remove the deactivated catalyst periodically, which is to be replaced by a fresh catalyst make-up in order to maintain the desired catalytic activity during the reaction. How to improve the stability of titanium silicate molecular sieve has become a focus.

U.S. Pat. No. 4,794,198 discloses a process for pretreating catalyst to increase the selectivity and improve the stability of catalyst. P. Roffia et al., Stud. Surf Sci. Catal. 55(1990) p.43 proposes that the catalytic reaction rate can be increased and the non-catalytic reaction thus can be minimized by optimizing the process conditions, e.g. selecting an appropriate solvent and increasing the catalyst concentration and reaction temperature. However, the improvement of the catalyst stability thus achieved is limited, since it has the problem concerning how to utilize and regenerate the deactivated catalyst due to the high cost of the titanium silicalite.

In general, there are two methods for regenerating the deactivated catalyst: washing with a solvent and calcining. In the book *Selective Oxidation by heterogeneous Catalysis* (2001), p.112, it is indicated that three main deactivation processes of titanium silicalites in the ammoximation of cyclohexanone: (1) slow dissolution of the framework (silicon) with accumulation of Ti on the external surface of the remaining solid, (2) direct removal of Ti from the framework and (3) pore filling by by-products. The book further points out that, the deactivation by pore filling can be partially eliminated by washing the catalyst with t-butanol. The regeneration effect is poor.

CN1302693A discloses a regeneration process of subjecting the catalyst, previously calcined, to a treatment in an aqueous medium with hydrogen peroxide in the presence of inorganic fluorinated compounds, subsequent to thermal treatment. This process is illustrated with an example related to a regeneration procedure of a catalyst deactivated in the ammoximation of cyclohexanone for preparing cyclohexanone oxime, wherein the catalytic activity of the regenerated catalyst can be recovered up to 84% relative to the activity of fresh catalyst. It also points out that if a catalyst is regenerated by thermal treatment only (calcined at 550° C.), the catalytic activity of the regenerated catalyst can be recovered to merely 31% relative to the activity of fresh catalyst. Anyhow, the catalytic activity of the regenerated catalyst obtained by this process is still not fully recovered to the level of fresh catalyst. Moreover, in this process, fluorinated compounds, are used in the chemical treatment thereof, which tend to be toxic and harmful.

CN 1290194A discloses a method of regenerating a supported catalyst covered with gold particles, based on titanium dioxide or titanium dioxide hydrate. The invention is characterised in that the catalyst is regenerated by contacting it with water, a diluted acid or a diluted hydroperoxide solution, to restore its catalytic activity. The catalyst used in this patent is prepared with a "deposition-precipitation" method and used for oxidizing unsaturated hydrocarbons in the gas phase. The dilute acid has a pH value of 4~7.5, preferably 5.5~6 and is preferably dilute $H_2SO_4$ or HF. Taking the oxidation of propene as an example, the catalytic activity of the catalyst regenerated according to the method of this patent can be recovered up to 80% relative to the activity of fresh catalyst It is impossible to recover the catalytic activity of the regenerated catalyst to the level of fresh catalyst by this method. Furthermore, the patent does not mention the stability of the regenerated catalyst

DESCRIPTION OF THE INVENTION

An object of the present invention is to provide a process for regenerating titanium-containing catalysts, which overcome the deficiencies of the prior arts, can make the activity of the regenerated catalyst be recovered to the level of its fresh catalyst, and can make the regenerated catalyst have an excellent stability.

The process for regenerating titanium-containing catalysts according to the present invention is characterized in that a deactivated catalyst is treated in an acidic solution having a pH value of $\leqq 3$, preferably $\leqq 1$, and then subjecting the treated catalyst to a drying and calcining process.

More specifically, the process according to the present invention is carried out by treating the deactivated catalyst in an acidic solution having a pH value of $\leqq 3$, preferably $\leqq 1$, at 50~100° C., preferably 70~90° C. for 0.5~6 hours, preferably 1~4 hours, wherein the concentration of the catalyst in the acidic solution is 1~20% by weight, preferably 3~15% by weight; and then subjecting the treated catalyst to a drying and calcining process.

In the regeneration process according to the present invention, said acidic solution is one inorganic acid selected from the group consisting of nitric acid, sulfuric acid, hydrochloric acid, phosphoric acid etc. It may also be a mixture of the aforementioned inorganic acid with hydrogen peroxide, wherein the concentration of said hydrogen peroxide in the mixture is 0~10% by weight, preferably 0~5% by weight.

Said titanium-containing catalyst can be a titanium-containing crystalline silica or a titanium-supported composite catalytic material. Said titanium-containing crystalline silica may be used in the form of its original powder or its molded form, being one selected from the group consisting of TS-1, TS-2, Ti-ZSM-5, Ti-ZSM-12, Ti-ZSM-48, Ti-β, Ti-MCM-41 and Ti-MOR.

The regeneration process according to the present invention is especially useful in regenerating the titanium-containing catalysts deactivated in the ammoximation of carbonyl compounds or in the oxidation reaction of nitrogenated basic compounds.

Said carbonyl compound is one selected from the group consisting of cyclohexanone, acetone, butanone, cyclopentanone, p-hydroxylacetophenone, acetophenone, cyclododecanone, furfural, benzaldehyde, p-methyl benzaldehyde, and the like. And, the nitrogenated basic compound is a secondary amine, ammonia, and the like.

The regeneration process of titanium-containing catalysts according to the present invention has significant regeneration effect. The catalytic activity, selectivity and stability of the regenerated catalyst can be recovered to the level of fresh catalyst and the catalyst can be regenerated and used for many times, whereby the availability of the catalyst is greatly increased and the unit consumption of the catalyst is reduced.

Furthermore, in the regeneration process according to the present invention, no fluorinated compounds which tend to be toxic are used, the raw materials are cheap and randomly available, and the operation is simple technologically.

EXAMPLES

The following examples are provided to further illustrate the present invention, but not to limit the invention in any way.

In the examples and comparative examples hereinbelow, the following materials were used: titanium silicalite-1 (TS-1) manufactured by Yueyang Jianchang Corp. Ltd., Hunan province, China; cyclohexanone ($\geqq 99.5\%$ in purity) available from Beijing Chemical Factory, Beijing, China, hydrogen peroxide solution (containing 27.5% by weight of $H_2O_2$) available from Tianjin Dongfang Chemical Factory, Tianjin, China; ammonia ($\geqq 99.9\%$ in purity) available from Beijing Experiment Chemical Factory, Beijing, China; and t-butanol (containing 86.5% by weight of t-butanol and the balance being water and a small quantity of impurities) available from Beijing Pingshun Chemical Industry Corp Ltd., Beijing, China. Unless otherwise specially stated, all the other chemical reagents were products with chemical purity grade available from Beijing Chemical Factory, Beijing, China.

Regeneration result of the catalyst was obtained by evaluating the stability of the catalyst.

For evaluating the stability of the catalyst, a continuous reaction slurry bed apparatus was used, wherein a 150-ml reactor was equipped with a magnetic stirrer and a heating oil-bath. Reaction feedstocks and reaction products flow in or out of the reactor continuously, but the catalyst was retained in the reactor. The composition of reaction products was analyzed with gas chromatography and the conversion rate of hydrogen peroxide was determined by measuring the content thereof with Iodometry.

In order to evaluate the stability of the catalyst in a short period, a relatively sensitive process condition for accelerating deactivation was employed in the evaluation test. That is, the evaluation was carried out at a higher feeding space velocity, a lower reaction temperature and catalyst concentration, as compared with an optimized process condition. The results obtained under said condition are representative and can show the results of the regeneration. However, the absolute figures therein are not equal to the data of the stability of the catalyst obtained under the optimized conditions.

In Examples 1-5 and Comparative Examples 1-3, the evaluation test was carried out with reaction conditions as follows $H_2O_2$:cyclohexanone=1.10:1 mol/mol; ammonia:cyclohexanone=1.70:1 mol/mol; tert-butanol:cyclohexanone=3.30: 1mol/mol; a catalyst concentration of 1.8% by weight, an average residence time of the reaction stream of 72 minutes; a reaction temperature of 76±1° C. and a atmospheric pressure.

The stable operation time of catalyst was calculated based on a one-way running period in which $\geqq 97\%$ of the conversion of cyclohexanone is obtained. Stability was evaluated in view of a fresh catalyst. The results are shown in Table 1.

Example 1

The deactivated catalyst used was a deactivated sample obtained by running a fresh catalyst stably for 40 hours in the evaluation test.

4.5 g of the deactivated sample was mixed with 90 g of 5% dilute nitric acid solution, stirred at 85° C. for 2 hours and filtered. The solid was washed with deionized water repeatedly, dried at 120° C. and calcined at 560° C. for 6 hours to obtain a regenerated catalyst.

Stability of the aforementioned regenerated catalyst was evaluated. Results are shown in Table 1.

Example 2

The deactivated catalyst used was a deactivated sample obtained by running the regenerated catalyst in Example 1 stably for another 42 hours, i.e. the same catalyst was subjected to the regeneration test twice.

The regeneration process was similar to that of Example 1. Results of the stability evaluation are shown in Table 1.

Comparative Example 1

The deactivated catalyst used in this comparative example was the same as that of Example 1.

Different from Example 1, the deactivated catalyst was not treated with an acid solution, but was dried and calcined directly to obtain the regenerated catalyst. Results of stability evaluation are shown in Table 1.

Comparative Example 2

The deactivated catalyst used in this comparative example was the same as that of Example 1.

Different from Example 1, the deactivated catalyst was calcined firstly, and then treated with an acid solution and calcined (the same as Example 1) to obtain the regenerated catalyst. Results of stability evaluation are shown in Table 1.

Comparative Example 3

The deactivated catalyst used in this comparative example was the same as that of Example 1.

4.0 g of the deactivated sample was mixed with 200 g of 0.0005% dilute sulfuric acid solution (pH4), stirred at 70° C. for 3 hours and filtered. The solid was washed with deionized water repeatedly, dried at 120° C. and calcined at 560° C. for 6 hours to obtain a regenerated catalyst. Results of stability evaluation are shown in Table 1.

Table 1 reveals that, for the catalysts regenerated only by calcining (Comparative Example 1) or by firstly calcining and then treating with an acidic solution and calcining (Comparative Example 2), although the catalytic activity and selectivity of the regenerated catalyst can be recovered, its stability is not recovered to the level of fresh catalyst. For the catalysts regenerated by treating with an acidic solution and calcining, no desired regeneration effect can be achieved if the concentration of the acid is too low (pH4) (Comparative Example 3). With the process of the present invention, however, the catalytic activity, selectivity and stability of the regenerated catalyst can be recovered to the level of fresh catalyst (Example 1). And the catalyst can be regenerated and used for many times (Example 2).

Example 3

The deactivated catalyst used was the same as that of Example 1.

4.5 g of the deactivated sample was mixed with 40 g of 3% dilate hydrochloric acid solution and 5 g of 27.5% of hydrogen peroxide solution, stirred at 75° C. for 2 hours and filtered. The solid was washed with deionized water repeatedly, dried at 120° C., then calcined at 560° C. for 6 hours to obtain a regenerated catalyst. Results of the stability evaluation are shown in Table 2.

Example 4

The deactivated catalyst used was the same as that of Example 1.

4.5 g of a deactivated sample was mixed with 90 g of 10% dilute phosphoric acid solution and 5 g of 27.5% of hydro-

TABLE 1

| | No. | | | | |
|---|---|---|---|---|---|
| | Comp. Ex. 1 | Comp. Ex. 2 | Comp. Ex. 3 | Ex. 1 | Ex. 2 |
| Initial state of catalyst | Fresh | Deactivated after running for 40 hrs. | Deactivated after running for 40 hrs. | Deactivated after running for 40 hrs. | Deactivated after running for 40 hrs. | Deactivated after running further for 42 hrs. after the first regeneration |
| Regeneration mode | — | Calcined | Calcined, Acid-treated and calcined | Acid-treated and calcined | Acid-treated and calcined | Acid-treated and calcined |
| Results of evaluation | | | | | | |
| Conversion of cyclohexanone, % | 98.5 | 98.4 | 98.4 | 98.6 | 98.6 | 98.6 |
| Conversion of $H_2O_2$, % | 100 | 100 | 100 | 100 | 100 | 100 |
| Selectivity of ketone to cyclohexanone oxime, % | 99.7 | 99.6 | 99.7 | 99.7 | 99.7 | 99.7 |
| Selectivity of $H_2O_2$ to cyclohexanone oxime, % | 89.3 | 89.1 | 89.1 | 89.4 | 89.4 | 89.4 |
| Stable operation time of catalyst, hrs. | 40 | 30 | 31 | 33 | 42 | 41 | gen peroxide solution, stirred at 80° C. for 1 hour and filtered. The solid was washed with deionized water repeatedly, dried at 120° C., then calcined at 560° C. for 6 hours to obtain a regenerated catalyst. Results of the stability evaluation are shown in Table 2.

Example 5

The fresh catalyst used was the same as that of Example 1, except that the deactivated sample used was obtained by running a fresh catalyst under an optimized condition for 400 hours.

150 g of the aforementioned deactivated sample was mixed with 1000 g of 5% dilute nitric acid solution, stirred at 90° C. for 3 hours and filtered. The solid was washed with deionized water repeatedly, dried at 120° C. and calcined at 560° C. for 6 hours to obtain a regenerated catalyst. Results of the stability evaluation are shown in Table 2.

TABLE 2

|  | No. | | | |
| --- | --- | --- | --- | --- |
|  | Fresh | Ex. 3 | Ex. 4 | Ex. 5 |
| Initial state of catalyst | Fresh | Deactivated after running for 40 hrs. | Deactivated after running for 40 hrs. | Deactivated after running for 400 hrs. |
| Regeneration mode | — | Treated with hydrochloric acid +$H_2O_2$ and calcined | Treated with phosphoric acid +$H_2O_2$ and calicined | Treated with nitric acid and calcined |
| Results of evaluation |  |  |  |  |
| Conversion of cyclohexanone, % | 98.5 | 98.4 | 98.4 | 98.6 |
| Conversion of $H_2O_2$, % | 100 | 100 | 100 | 100 |
| Selectivity of ketone to cyclohexanone oxime, % | 99.7 | 99.6 | 99.5 | 99.7 |
| Selectivity of $H_2O_2$ to cyclohexanone oxime, % | 89.3 | 89.1 | 89.0 | 89.4 |
| Stable operation time of catalyst, hrs. | 40 | 39 | 38 | 42 |

Table 2 reveals that the activity, selectivity and stability of the regenerated catalyst can be recovered to the level of fresh catalyst.

Examples 6-9

In Examples 6-9, the ammoximation process was carried out by reacting acetone, cyclopentanone, benzaldehyde, p-methylbenzaldehyde as the feedstocks respectively with ammonia and hydrogen peroxide in the presence of Ti-MOR (Si/Al=300 (prepared according to the process recited in J. Catal. 168(1997) p.400) as the catalyst, wherein water was used as the solvent and the reaction conditions were as follows: $H_2O_2$:ketone(aldehyde)=1.15:1 mol/mol, ammonia: ketone(aldehyde)=2.0:1 mol/mol, water:ketone (aldehyde) =8:1 vol/vol, a catalyst concentration of 3.0% by weight, an average residence time of reaction stream of 120 minutes, a reaction temperature of 60±1° C. and a atmospheric pressure.

The aforementioned deactivated catalyst was regenerated under the same regeneration condition as Example 1.

The regenerated catalyst was evaluated for stability. In these examples, said stable operation time was based on a one-way running period in which ≧90% of the conversion is obtained.

Results are shown in Table 3.

Comparative Examples 4-7

In Comparative Examples 4-7, the catalysts and the evaluation reactions therefor were similar to those in Examples 6-9, except that the deactivated catalysts were not treated with the acid solutions, but were directly dried and calcined to obtain the regenerated catalysts. Results of the stability evaluation are shown in Table 3.

Example 10

The catalyst used was TS-1, and the fresh catalyst was the same as Example 1. Oxidation reaction was carried out between diethylamine and hydrogen peroxide in the presence of t-butanol as the solvent under evaluation conditions as follows: $H_2O_2$:amine=1.1:1 mol/mol, t-butanol: amine=5:1 mol/mol, a catalyst concentration of 2.5% by weight, an average residence time of reaction stream of 60 minutes, a reaction temperature of 80±1° C. and a atmospheric pressure.

The aforementioned deactivated catalyst was regenerated under regeneration conditions similar to those in Example 1.

The regenerated catalyst was evaluated for stability and the stable operation time was based on a one-way running period in which ≧90% of the conversion is obtained. Results are shown in Table 3.

Comparative Example 8

The catalyst and evaluation reaction in this comparative example were the same as those in Example 10, except that the deactivated catalyst was not treated with an acidic solution, but was directly dried and calcined to obtain a regenerated catalyst.

Results of the stability evaluation are shown in Table 3.

Example 11

The reaction of cyclohexanone with ammonia and hydrogen peroxide was catalyzed by using a Ti-dispersed silica catalyst (prepared in a way similar to that in Example 6 in EP0347926) and the condition for evaluation test was similar to that in Example 1.

The aforementioned deactivated catalyst was regenerated under the same condition as that in Example 1.

The regenerated catalyst was evaluated for stability. Results are shown in Table 3.

Comparative Example 9

The catalyst and evaluation reaction were the same as those in Example 11, except that the deactivated catalyst was not treated with an acidic solution, but was directly dried and calcined. Results of the stability evaluation are shown in Table 3.

TABLE 3

| No. | Reactant | Regeneration mode | Stable operation time of catalyst (compared with fresh catalyst) |
|---|---|---|---|
| Example 6 | Acetone | Acid-treated and calcined | 105 |
| Example 7 | Cyclopentanone | Acid-treated and calcined | 98 |
| Example 8 | Benzaldehyde | Acid-treated and calcined | 90 |
| Example 9 | p-Methyl benzaldehyde | Acid-treated and calcined | 95 |
| Example 10 | Diethylamine | Acid-treated and calcined | 95 |
| Example 11 | Cyclohexanone | Acid-treated and calcined | 96 |
| Comp. Example 4 | Acetone | Calcined | 75 |
| Comp. Example 5 | Cyclopentanone | Calcined | 70 |
| Comp. Example 6 | Benzaldehyde | Calcined | 65 |
| Comp. Example 7 | p-Methyl benzaldehyde | Calcined | 70 |
| Comp. Example 8 | Diethylamine | Calcined | 65 |
| Comp. Example 9 | Cyclohexanone | Calcined | 70 |

Table 3 reveals that, for the catalysts regenerated by calcining in the comparative examples, their stability can only be recovered to about 65~75% of the level of fresh catalyst. However, by using the regeneration process of the present invention, the stability of the regenerated catalysts can be recovered substantially to the level of fresh catalyst.

The present application claims priority under 35 U.S.C. §119 of Chinese Patent Application No. 02120784.4 filed on May 31, 2002. The disclosure of the foregoing application is expressly incorporated by reference herein in its entirety.

The invention claimed is:

1. A process for regenerating titanium-containing catalysts, consisting essentially of:
   mixing a previously used and deactivated titanium-containing catalyst with a solution consisting essentially of an acid, wherein said previously used and deactivated titanium-containing catalyst is an ammoximation or oxidation catalyst and undergoes no regenerating calcination prior to said mixing and with the proviso that said solution does not include hydrogen peroxide;
   separating the catalyst from the solution;
   drying the catalyst; and
   calcinating the catalyst.

2. The process according to claim 1, wherein the concentration of the previously used and deactivated catalyst in the solution is from about 1 to about 20% by weight, and the treatment is carried out at about 50 to about 100° C. for about 0.5 to about 6 hours.

3. The process according to claim 2, wherein the concentration of the previously used and deactivated catalyst in the solution is from about 3 to about 15% by weight, and the treatment is carried out at about 70 to about 90° C. for about 1 to about 4 hours.

4. The process according to claim 1, wherein said titanium-containing catalyst is a titanium-containing crystalline silica.

5. The process according to claim 1, wherein said titanium-containing catalyst is a titanium-supported composite catalytic material.

6. The process according to claim 4, wherein said titanium-containing crystalline silica is selected from the group consisting of TS-1, TS-2, Ti-ZSM-5, Ti-ZSM-12, Ti-ZSM-48, Ti-β, Ti-MCM-41 and Ti-MOR.

7. The process according to claim 4, wherein said crystalline titanium silica is in the form of its original powder and its molded form.

8. The process according to claim 1, wherein said acid is selected from the group consisting of nitric acid, sulfuric acid, hydrochloric acid and phosphoric acid.

9. The process according to claim 1, wherein the solution has a pH value of ≦3.

10. The process according to claim 1, wherein the solution has a pH value of ≦1.

11. A process for regenerating titanium-containing catalysts, consisting essentially of:
   mixing a previously used and deactivated titanium-containing catalyst with a solution consisting essentially of an acid, wherein said previously used and deactivated titanium-containing catalyst is an ammoximation or oxidation catalyst and undergoes no regenerating calcination prior to said mixing;
   separating the catalyst from the solution;
   drying the catalyst; and
   calcinating the catalyst.

12. A process for regenerating titanium-containing catalysts, comprising:
   mixing a previously used and deactivated ammoximation or oxidation catalyst with a solution consisting essentially of an acid, wherein said previously used and deactivated ammoximation or oxidation catalyst is a titanium-containing crystalline silica catalyst which undergoes no regenerating calcination prior to said mixing;
   separating the catalyst from the solution;
   drying the catalyst; and
   calcinating the catalyst.

* * * * *